J. D. Parrot.
Water Filter.
No. 93,339. Patented Aug. 3, 1869.
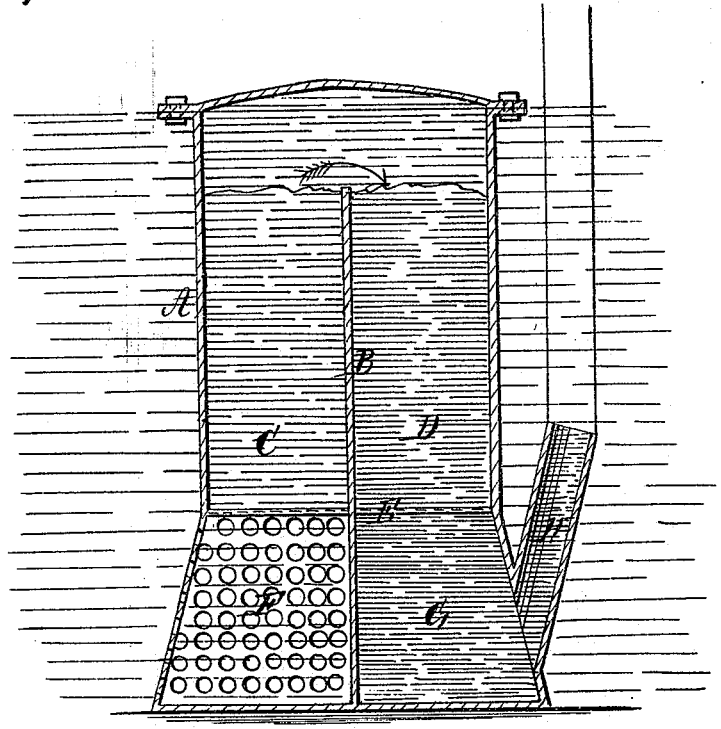
Witnesses
Gustave Dieterich
Wm A Morgan
Inventor
J. D. Parrot
per Munn & Co
Attorneys

United States Patent Office.

J. D. PARROT, OF MORRISTOWN, NEW JERSEY, ASSIGNOR TO HIMSELF AND HENRY McCAULEY, OF SAME PLACE.

Letters Patent No. 93,339, dated August 3, 1869; antedated July 30, 1869.

IMPROVEMENT IN FILTERS.

The Schedule referred to in these Letters Patent and making part of the same.

*To all whom it may concern:*

Be it known that I, J. D. PARROT, of Morristown, in the county of Morris, and State of New Jersey, have invented a new and useful Improvement in Water-Filters; and I do hereby declare that the following is a full, clear, and exact description thereof, which will enable those skilled in the art to make and use the same, reference being had to the accompanying drawings, forming part of this specification.

This invention relates to a useful improvement in apparatus for filtering water, which is adapted to use in wells and cisterns, and in connection with water-pipes, whereby the water is drawn through filtering-material in different compartments.

The invention consists in the construction and arrangement of parts, as will be hereinafter described.

The drawing represents a vertical central section of the filter, showing its construction and arrangement.

This filter is designed to be used in an upright position, as represented, ordinarily, but it may be placed on its side where the water is shallow, for taking the water from near the bottom of the well or cistern.

A is the filtering-vessel, which may be either square or cylindrical, and made of any suitable material, with a central upright partition, B, running from the bottom to near the top, as seen in the drawing.

The two compartments, C and D, contain charcoal and sand or other suitable filtering-material, which rests on the perforated bottom E.

The lower portion of the filtering-vessel may be enlarged, as seen in the drawing.

One of the compartments in the base of the vessel F is perforated, as seen, through which perforations the water enters when the filter is submerged or placed in the water.

The water ascends through the perforated bottom E, into the compartment C, and passes over the partition B, as indicated by the arrow, and descends, through the compartment D, into the pure-water chamber D.

The pump is attached to the pipe H.

I is the cover to the filter, which is securely fastened down by bolts or otherwise.

The act of pumping creates a vacuum in the pipe, so that the pressure of the atmosphere forces the water through the filter.

Where the water is shallow, or when it is desired to withdraw nearly all the water from a well or cistern, the vessel may be laid on its side.

In this case it would be necessary to attach the discharge-pipe H differently from that shown, but the operation of the filter would be the same.

This filter is adapted to all situations where it is desired to filter the water, and the advantages which it possesses over the filters now in use must be obvious to all.

I claim as new, and desire to secure by Letters Patent—

The water-filter composed of the case A, having the central partition B and the perforated diaphragm E, arranged as described and shown, to produce the chamber F, having perforated walls, the filtering-chambers C D, and the clear-water chamber G, having the discharge-tube H, as and for the purpose specified.

The above specification of my invention signed by me, this 12th day of September, 1868.

J. D. PARROT.

Witnesses:
ALEXR. DICKERSON,
C. V. FREEMAN.